United States Patent [19]

Schutte

[11] Patent Number: 4,458,263
[45] Date of Patent: Jul. 3, 1984

[54] VIDEO SIGNAL PROCESSING CIRCUIT FOR A COLOR TELEVISION RECEIVER

[75] Inventor: Evert H. Schutte, Nijmegen, Netherlands

[73] Assignee: U.S. Philips Corporation, New York, N.Y.

[21] Appl. No.: 340,180

[22] Filed: Jan. 18, 1982

[30] Foreign Application Priority Data

Feb. 9, 1981 [NL] Netherlands ............... 8100604

[51] Int. Cl.³ .................. H04N 9/52; H04N 9/535
[52] U.S. Cl. .................................. 358/30; 358/27; 358/37
[58] Field of Search .............. 358/30, 37, 39, 27, 358/28, 168

[56] References Cited

U.S. PATENT DOCUMENTS

| | | | |
|---|---|---|---|
| 3,588,827 | 6/1971 | Vanroessel | 358/30 |
| 3,689,689 | 9/1972 | Weitzsch | 358/30 |
| 3,952,327 | 4/1976 | Hofman | 358/37 |
| 4,167,750 | 9/1979 | Tomimoto | 358/27 |

Primary Examiner—Tommy P. Chin
Attorney, Agent, or Firm—Thomas A. Briody; William J. Streeter; Edward W. Goodman

[57] ABSTRACT

In a video signal processing circuit for a color television receiver, a brightness setting, which is operative for external color signals as well as for internal color signals and which does not produce a color shift, can be obtained by combining with the luminance signal (Y) a level shift signal (H) the amplitude of which is adjustable by the brightness setting and by employing in each color channel two clamping circuits, the first one of which clamps a first reference level ($RL_1$) in the external color signal (ER, EG, EB) onto a combination of the level shift signal and the internal color signal (R, G, B) and the second clamping circuit clamps a second reference leve ($RL_2$) which occurs in the sum signal of the internal and the external color signal when the level shift signal has zero value, onto the cutoff level of the relevant electron gun of a picture display tube.

2 Claims, 2 Drawing Figures

VIDEO SIGNAL PROCESSING CIRCUIT FOR A COLOR TELEVISION RECEIVER

BACKGROUND OF THE INVENTION

The invention relates to a video signal processing circuit for a color television receiver having inputs for a luminance signal, for color difference signals, and for external color signals, comprising a matrix circuit for combining a color difference signal with the luminance signal to form a color signal, a first clamping circuit for clamping an external color signal onto the corresponding color signal, a combining circuit for combining a clamped external color signal with the corresponding color signal, a second clamping circuit acting on an output signal of the combining circuit and a brightness setting circuit.

A video signal processing circuit of the type defined above is described in Philip Data Handbook for Integrated Circuits, Part 2, May, 1980 as IC TDA3560. The brightness setting, which is common for internal and external video signals, is obtained by means of a common direct current level setting of the second clamping circuits. The settings of the three electron guns of a picture display tube coupled to the outputs of the video signal processing circuit are changed to an equal extent by this direct current level setting as a result whereof, due to the mutual differences in the efficiency of the phosphors of the picture display tube, a color shift may occur at a brightness adjustment. It is an object of the invention to prevent this.

SUMMARY OF THE INVENTION

According to the invention, a video signal processing circuit of the type defined in the preamble is therefore characterized in that the first clamping circuit acts on a first reference level occurring in a first group of periods and the second clamping circuit acts on a second reference level occurring in a second group of periods which differ from the periods of the first group, while the brightness setting circuit is an amplitude setting circuit for a level shift signal with which the relative position of the second reference level with respect to the remaining portion of the luminance signal is adjustable.

Owing to the measure in accordance with the invention, the common setting of the brightness for internal video signals is maintained and a color shift is prevented from occurring at a brightness setting.

DESCRIPTION OF THE DRAWINGS

An embodiment of the invention will now be further described by way of example with reference to the accompanying drawings.

In the drawings.

DESCRIPTION OF THE PREFERRED EMBODIMENT

Figure 1:
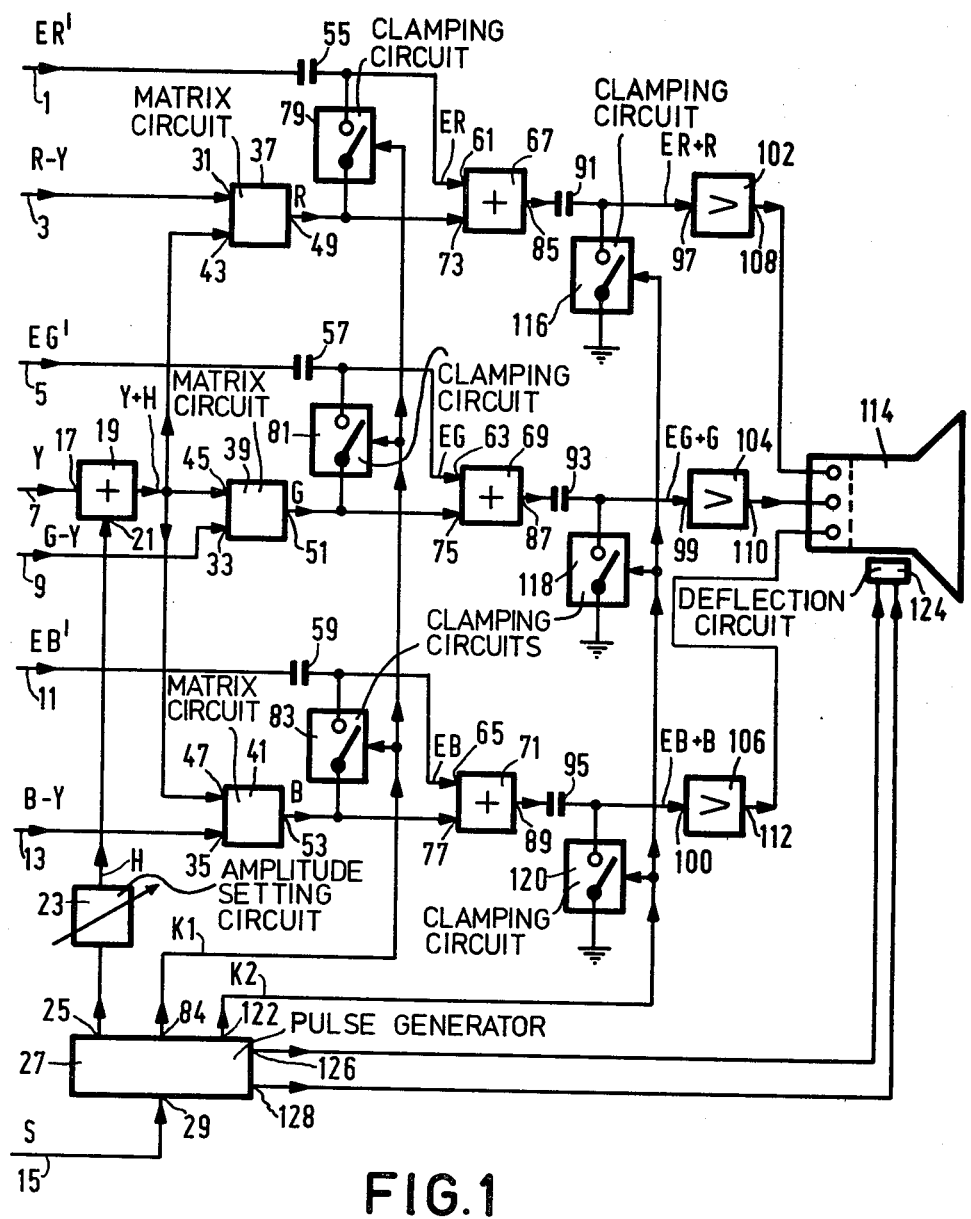
FIG. 1 illustrates, by means of a block schematic circuit diagram, a video signal processing circuit in accordance with the invention.

In FIG. 1, an external red color signal ER' is applied to an input 1, a red color difference signal (R−Y) to an input 3, an external green color signal EG' to an input 5, a luminance signal Y to an input 7, a green color difference signal (G−Y) to an input 9, an external blue color signal EB' to an input 11, a blue color difference signal (B−Y) to an input 13 and a synchronizing signal S to an input 15.

Figure 2:
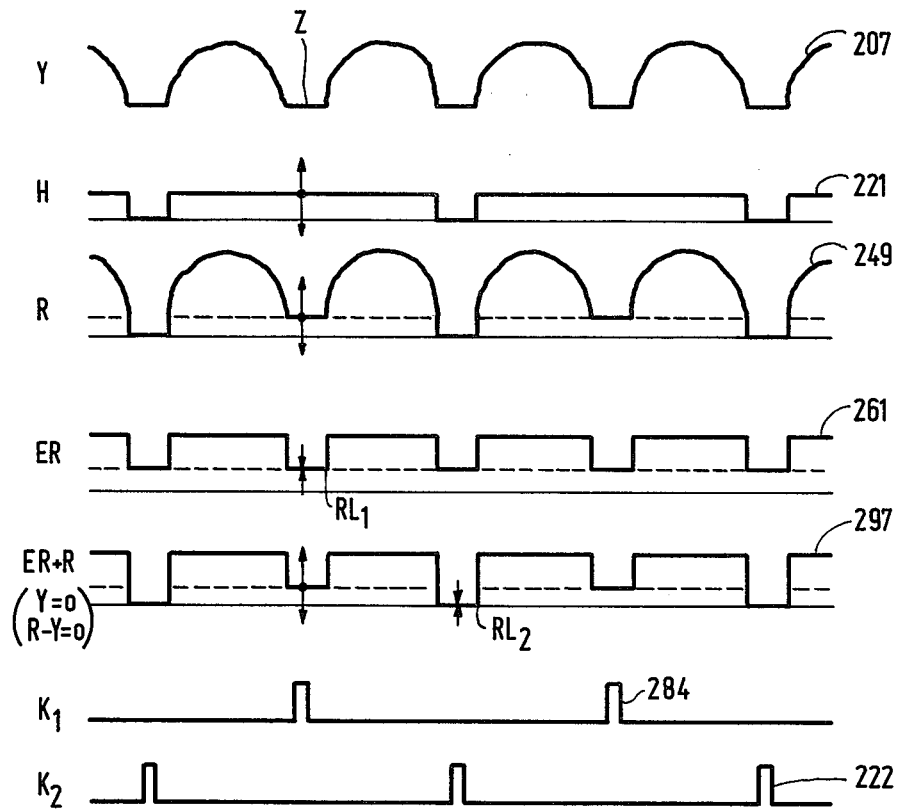
FIG. 2 shows some waveforms such as they may occur in the circuit shown in FIG. 1.

The luminance signal at the input 7 is shown in FIG. 2 as a waveform 207. In the line flyback periods this luminance signal has a black level Z which, for simplicity, is assumed to occur in all cases during the whole line flyback period but which may, of course, alternatively occur during only a portion of that line flyback period.

The luminance signal Y is applied to an input 17 of a combining circuit 19. To a further input 21 thereof, a level shift signal H is applied which, via an amplitude setting circuit 23, is obtained from an output 25 of a pulse generator 27, to an input 29 of which the synchronizing signal S is applied.

The level shift signal H is shown in FIG. 2 as a waveform 221 which in this case has a zero amplitude every other line flyback period and at other times an amplitude which depends on the setting of the amplitude setting circuit 23.

The respective color difference signals (R−Y), (G−Y) and (B−Y) at the respective inputs 3, 9 and 13, are applied to inputs 31, 33 and 35, respectively, of matrix circuits 37, 39 and 41, respectively, to respective inputs 43, 45 and 47 of which the combination Y+H of the luminance signal (Y) and the level shift signal (H) is applied, and from respective outputs 49, 51 and 53, the red (R) and green (G) and blue (B) color signals are obtained. FIG. 2 shows the red color signal of said color signals as a waveform 249.

The respective external color signals ER', EG' and EB' at the respective inputs 1, 5 and 11 are applied to respective inputs 61, 63 and 65 of respective combining circuits 67, 69 and 71 via respective capacitors 55, 57 and 59. Further inputs 73, 75 and 77, respectively, of the combining circuits 67, 69 and 71, respectively, are connected to the outputs 49, 51 and 53, respectively, of the matrix circuits 37, 39 and 41, respectively, and receive the red, green and blue color signals, respectively.

Arranged between the inputs 61 and 73, 63 and 75, and 65 and 77, respectively, there are first clamping circuits 79, 81 and 83, respectively, which, under the control of a pulse signal $K_1$ coming from an output 84 of the pulse generator 27, clamps a first reference level $RL_1$ in the respective external color signals ER', EG' and EB' onto the respective color signals R, G and B, as a result of which the respective clamped external color signals ER, EG and EB at the respective inputs 61, 63 and 65 of the combining circuits 67, 69 and 71 are produced, the signal level ER at the input 61 of the combining circuit 67 being shown in FIG. 2 as the waveform 261. The pulse signal $K_1$ is shown in FIG. 2 as the waveform 284.

At respective outputs 85, 87 and 89 of the combining circuits 67, 69 and 71, respectively, there are now produced signals which are the sums of the respective clamped external color signals ER, EG and EB and the respective color signals R, G and B. Via respective capacitors 91, 93 and 95, said sum signals (ER+R), (EG+G) and (EB+B), respectively, are applied to respective inputs 97, 99 and 100 of respective video output amplifiers 102, 104 and 106, respective outputs 108, 110 and 112 of which being connected to respective cathodes of a picture display tube 114.

Second clamping circuits 116, 118 and 120, respectively, which are rendered operative by a pulse signal $K_2$ coming from an output 122 of the pulse generator 27 and whereby a second reference level RL2 in the signals at the respective inputs 97, 99 and 100 is adjusted to a fixed potential, zero potential here, are connected to the respective inputs 97, 99 and 100 of the respective video output amplifiers 102, 104 and 106. This is shown in FIG. 2 by means of the waveform 297 for the signal (ER+R) at the input 97 of the video output amplifier 102. For the sake of clearness, the luminance signal (Y) and the red color difference signal (R−Y) are assumed to have zero values.

The picture display tube 114 has a deflection circuit 124 which is controlled by signals coming from outputs 126 and 128, respectively, of the pulse generator 27.

On the basis of FIG. 2, it will now be demonstrated that the brightness of the color signals as well as of the external color signals is adjustable by means of the amplitude setting circuit 23, more specifically in such a ratio, occurring at the picture display tube 114, that no color shift is produced.

If a luminance signal Y and a color difference signal (R−Y) are produced and the external color signal ER' has zero value, the signal at the output 49 of the matrix circuit 37 has the waveform 249 and likewise the signal at the input 97 of the video output amplifier 108, as during the occurrence of the signal K2 (waveform 222), the second clamping circuit 116 has adjusted the second reference level RL2 to zero, which corresponds to the cutoff level of the relevant cathode of the picture display tube 114. Outside the periods in which signal is clamped to the second reference level RL2, the black level, shown in the waveform 249 by means of a dashed line, of the color signal at the input 97 of the video amplifier is determined by the amplitude of the level shift signal H, which, in response to the video output amplifier gain factors which are adapted to the efficiencies of the phosphors of the picture display tube, are applied in the relevant signal paths to the cathodes of the picture display tube 114 to said cathodes in such an amplitude ratio that no color shift can be produced.

If there is an external color signal but no luminance and color difference signals (Y=O, R−Y=O, G−Y=O, B−Y=O), then a signal is produced at the input 97 of the video output amplifier 102 which has the waveform 297 and which, during the occurrence of the second reference level RL2, is clamped onto zero by the second clamping circuit 116 by means of the clamping pulses K2 and which consequently corresponds to the cutoff level of the relevant cathode of the picture display tube 114. During the occurrence of the first reference level RL1 in the signal ER', the first clamping circuit 79 clamps the signal ER (waveform 261) at the input 61 of the combining circit 61 onto the output signal of the matrix circuit 37 during the occurrence of the clamping pulses K1 (waveform 284). Now this output signal has the waveform 221, as R−Y and Y have zero values. From the waveform 297, it now appears that the signal ER+R, which in this case is equal to ER+H, has, outside the periods in which the second reference level RL2 occurs in the waveform 297, a black level which is indicated by means of a dashed line and is determined by the amplitude of the level shift signal H. Also now this amplitude is applied in the proper ratio to the cathodes of the picture display tube 114 by the video output amplifier gain factors which are adapted to the efficiencies of the phosphors of the picture display tube 114, so that no color shift can be produced.

It will be obvious that it is not imperative that the clamping pulses K1 and K2 be produced alternately and every other line flyback period. If so desired, the clamping pulses K1 may, for example, occur in a number of line trace periods of the field trace which are located outside the visible picture plane, and the clamping pulses K2 may occur in the line flyback periods. The clamping pulses K2 must be produced in the period in which the level shift signal causes the second reference level RL2 and the clamping pulses K1 outside said periods and in the periods the first level reference level RL1 occurs.

In the above-described embodiment the clamping circuits are provided in the form of short-circuiting switches which are arranged subsequent to capacitors which have for their function to block direct current signals. It will be obvious, that, if so desired, clamping circuits in the form of control circuits may alternatively be used and that in that event, if so desired, blocking the direct current component by a capacitor may be omitted.

If so desired, instead of an adder circuit 19, an insertion circuit may be employed by means of which, in the appropriate periods of the luminance signal, when the signal K2 is produced the reference level Z then present, is replaced by a new level which is influencable by the brightness setting.

What is claimed is:

1. A video signal processing circuit for a color television receiver having inputs for a luminance signal, for color difference signals and for external color signals, comprising respective matrix circuits for combining the respective color difference signals with the luminance signal to form respective color signals, respective first clamping circuits for clamping the respective external color signals onto the respective color signals, respective combining circuits for combining the respective clamped external color signals with the respective color signals, respective second clamping circuits for clamping the outputs of the respective combining circuits onto a predetermined level, and a brightness setting circuit, characterized in that the first clamping circuits act on a first reference level in said respective external color signals occurring in a first group of periods and the second clamping circuits act on a second reference level occurring in a second group of periods which differ from the periods of the first group, while the brightness setting circuit is an amplitude setting circuit for a level shift signal, which is combined with the luminance signal prior to processing the color difference signals, with which the relative position of the second reference level with respect to the remaining portion of the luminance signal is adjustable.

2. A video signal processing circuit as claimed in claim 1, characterized in that the respective first and second clamping circuits are operative alternately and every other line flyback period.

* * * * *